United States Patent [19]

Derbyshire

[11] Patent Number: 4,659,912

[45] Date of Patent: Apr. 21, 1987

[54] THIN, FLEXIBLE, AUTOREGULATING STRAP HEATER

[75] Inventor: Rodney L. Derbyshire, Menlo Park, Calif.

[73] Assignee: Metcal, Inc., Menlo Park, Calif.

[21] Appl. No.: 658,245

[22] Filed: Oct. 5, 1984

Related U.S. Application Data

[63] Continuation-in-part of Ser. No. 623,238, Jun. 21, 1984.

[51] Int. Cl.[4] .............................................. H05B 3/58
[52] U.S. Cl. ................................... 219/535; 219/233;
219/543; 338/283
[58] Field of Search .................. 338/210, 280, 283;
219/535, 233, 236, 528, 524, 542, 543, 544, 548,
549

[56] References Cited

U.S. PATENT DOCUMENTS

| | | | |
|---|---|---|---|
| 3,218,384 | 11/1965 | Shaw | 174/40 |
| 3,266,661 | 8/1966 | Dates | 338/283 X |
| 3,448,246 | 6/1969 | Armbruster | 219/528 |
| 4,091,813 | 5/1986 | Shaw et al. | 128/303.14 |
| 4,185,632 | 1/1980 | Shaw | 128/303.1 |

FOREIGN PATENT DOCUMENTS 1076772  7/1967  United Kingdom .

OTHER PUBLICATIONS

"New Method of Preventing Ice Formation on Exposed Power Conductors", Tom et al, Proc., IEE, vol. 112, No. 11, Nov. 1965, p. 2,125.

Primary Examiner—E. A. Goldberg
Assistant Examiner—M. M. Lateef
Attorney, Agent, or Firm—Hall, Myers & Rose

[57] ABSTRACT

A simple, highly flexible, virtually massless, temperature autoregulating heater primarily useful for soldering has an energizing circuit that may be integral with or separate from the heater element, which element has a ferromagnetic material energized via the circuit from a constant current source whereby regulation occurs about the Curie temperature of the magnetic material. The energizing circuit may be in the form of a printed circuit conductor formed on a thin layer of Kaptan or like high temperature insulating material having the heater formed on the reverse side thereof or having a sticky substance thereon so that the energizing circuit may be temporarily adhered to the heater and removed after use. Alternatively, the energizing circuit may be formed directly on Nomex paper or the like; a quite thin paper with a sticky backing. The magnetic material may be one member of a laminate of materials having different conductive and magnetic properties whereby upon the magnetic material achieving Curie temperature, the current spreads into a layer of lower resistivity; providing large autoregulating ratios. The unusually high wattage-to-weight ratio of the heater permits large quantities of heat to be applied to a load within a very short interval which together with the ability to concentrate the applied heat to a small, well defined area permits rapid heating of the load, an essential characteristic where damage to insulation must be prevented.

18 Claims, 17 Drawing Figures

THIN, FLEXIBLE, AUTOREGULATING STRAP HEATER

RELATED APPLICATIONS

This application is a continuation-in-part application of pending application Ser. No. 623,238, filed June 21, 1984 in the name of Rodney L. Derbyshire and assigned to the same assignee.

BACKGROUND OF THE INVENTION

The present invention relates to autoregulating heaters and more particularly to a thin, flexible, low mass, inexpensive autoregulating heater primarily for use in soldering to braids of electrical conductors and the like and to rapidly adhering thin, relatively flexible heaters to device having large masses relative to said heater.

The present invention is closely related to U.S. patent application Ser. No. 586,712 filed on Mar. 6, 1984 in the name of Paul F. Busch entitled Flexible Autoregulating Heater with a Latching Mechanism, and assigned to the same assignee as the present application. In application Ser. No. 586,712, there is disclosed a Solder Strap which is relatively flexible and carries a latch so that the strap may be cinched about two overlapping members or braids. The strap includes a temperature autoregulating heater employing, for instance, a heater as disclosed in U.S. Pat. No. 4,256,945 to Carter and Krumme, or the like. The strap is tightened about the device to be soldered by, for instance, a modified Panduit tool that both cinches the strap and applies a constant current thereto. Such a system permits joining of overlapped shield braids of cables used, for instance, in the computer and communications industries. The strap usually, but not necessarily, has solder formed on the surface that contacts the braids, the solder being kept in intimate contact with the braid during the entire operation by the cinching function of the tool. Upon application of current, the solder is quickly melted (fused) well before damage to the insulation under the braids; a long standing problem in such operations.

In the computer field, in particular, it is desirable and, at times essential, to ground insulated and braided cables every 20 to 50 feet, depending upon environment, to suppress electromagnetic interference and control cross-talk, both of which are serious problems in computer terminal-host interconnections and like networks which include communications systems, particularly those used in data transmission. The attachment of a ground strap to such a cable requires removal of the outer insulation and soldering of a lead to the braid. This procedure is known as a "side entry" installation and is quite a troublesome procedure due to the very real danger of damaging the insulation under the braid.

The Solder Strap can be used to apply ground leads to cable braids in many instances, but on installations involving flat cables, problems develop as a result of the tendency of the cable to roll into an annulus when cinched. Also, the solder strap is unnecessarily overdesigned for most such installations, being a relatively high powered device by the very nature of its design for its intended purpose; cinching during soldering large loads (overlapped braids) and providing mechanical reinforcement to the completed solder joint.

In addition the solder strap does not lend itself to utilization with irregular shapes and is not appropriate to use on flat bodies, particularly where the entire area under the heater must be intimately bonded to the adjacent surface such as where it is desired to repair cracks in surfaces.

SUMMARY OF THE INVENTION

The present invention relates to a materially simplified form of Solder Strap known as a Simple Strap. This device has an energizing circuit which in its simplest form is a U-shaped conductor of copper foil disposed on a thin paper-like substance having a sticky substance on the surface opposite the conductor. The actual heater comprises a thin member of copper or the like with a layer of magnetic material (such as Alloy 42) disposed on a flat surface of the copper. The layer of magnetic material preferrably has a thickness of approximately 0.5 to 1.8 skin depths at the frequency of the source disposed on a flat surface of the copper. The heater is disposed on the surface of the paper-like substances opposite the conductor. Energy is transferred to the heater by electromagnetic induction. Solder may be disposed on the surface of the copper remote from the magnetic material of the paper-like substance.

The copper-Alloy 42 laminate together with the solder and energizing circuit weigh about 1 gram and can deliver at least 150 watts of heat energy to a load. In consequence, even under load, the heater heats to Curie temperature in 1 to 2 seconds, the Curie temperature of Alloy 42 being well above the melting temperature of common tin-lead solder used in electrical systems.

The heater is of such thin, flexible construction that it can readily conform to the shape of any cable surface and can be held in intimate contact with the cable or braid or other surface, whether regular or irregular throughout its length by an appropriate application tool. In use, the energizing circuit, if formed separately from the heater, is applied to (adhered to) the heater and the combination is wrapped about the work or placed on a surface, held in place, and current applied thereto. After soldering is achieved, the energizing circuit may be stripped off leaving behind the heater as a mechanical bonding agent for a ground lead or strap or as a mechanical patch to a cracked surface or the like.

In one of the preferred embodiments of the invention, a thin extension member of the heater laminate structure extends well beyond the magnetic member and forms the grounding strap of the installation. Alternatively, a separate wire may be employed as the ground lead. An end-stripped length of wire is placed on the braid and, the Simple Strap is applied over the wire and energized to effect soldering.

There are many possible variations of the above configuration. The magnetic member is selected in accordance with the maximum temperature desired; the Curie temperature of the various ferromagnetic materials being well known in the art. Very delicate cable insulations may require lower temperature heaters and low melting point solders.

In a further modification of the device, a somewhat stronger and/or higher temperature support for the energizing circuit is supplied, for instance, Kapton, a mica tape, or a ceramic fiber scrim which may also have a sticky substance applied to the surface opposite the energizing circuit. In still another embodiment, the heater is formed directly on such opposite side of the energizing circuit support, in which case, the entire heater assembly remains attached to the cable.

The choice of the various configurations of the Simple Strap depends upon the wattage required to perform the desired function, the temperature required, and the type of ground strap to be employed, a wire being employed where greater strength is required than can be provided by a thin metal strip. Further, although it is preferred to employ inductive coupling between the energizing circuit and the heater primarily due to its extreme simplicity, a conductive connection between the source and the heater may be employed; for instance, where it is desired to increase the resistance of the device to simplify impedance matching of the heater apparatus to the current source. In such an embodiment, the energizing circuit may be integral with or separable from the heater.

Although the present invention is described as primarily useful in applying ground straps to cables via a side entry, there are many other practical uses for the heater of the present invention such as joining two wires, soldering leads to flat surfaces, or to repairing cracked surfaces. In this latter application a patch may be achieved by applying an appropriately shaped heater over the cracks. A thermosetting bonding agent which may be repaired. The conductor is usually serpentine to insure even distribution of heat or to provide a good impedance match to enhance the energy delivered to the heater. Once the device is heated and secured to the surface, the conductor and paper-like insulator may be removed leaving an exposed metallic surface. If necessary to insure a strong patch, additional layers may be applied by bonding. Successive heater members one on top of the other until the required strength is achieved.

It is thus a primary object of the present invention to provide an inexpensive, low mass, high power, highly flexible temperature autoregulating heater.

DETAILED DESCRIPTION OF THE INVENTION

Figure 1:
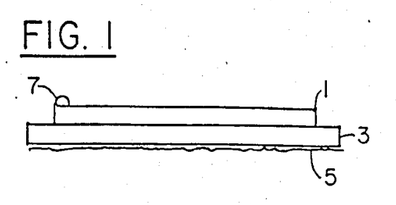
FIG. 1 is a side view in elevation of an energizing circuit of the present invention.
Figure 2:
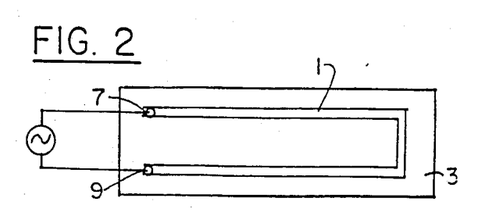
FIG. 2 is a top view of the energizing circuit of FIG. 1.
Figure 3:
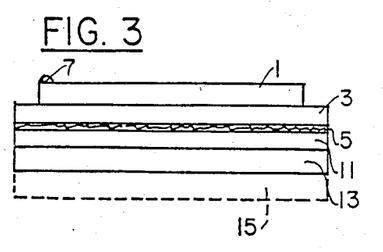
FIG. 3 is a side view in elevation of a heater circuit according to the present invention having the energizing circuit of FIGS. 1 and 2 physically applied and inductively coupled thereto.

Referring now specifically to FIGS. 1-3 of the accompanying drawings, there is illustrated one embodiment of a complete heating system in accordance with the present invention. In FIG. 1, an energizing circuit 1 is mounted on the upper surfce of a dielectric paper tape 3 with a sticky substance 5 applied to its underside; such a paper tape being sold under the name Nomex. As an indication of typical size of the elements 1 and 3, the energizing circuit is of 0.003 inch thick copper foil and the Nomex paper is 0.002 inch thick. The circuit 1 is illustrated in a top view in FIG. 2 and is U-shaped so as to increase length and, therefore, increase its resistance in order to ease the problem of matching its impedance to an energy source, as discussed subsequently. The circuit 1 is supplied with raised contacts 7 and 9 for ease of connection to a source, also as explained later.

The heater length depends upon the size of the device to be enclosed and may range from less than an inch to as long as necessary. The width of the copper conductor may be, for example, 0.1 inch with a separation between legs of the U as little as 005 inch but preferrably 0.1 inch or more.

Referring to FIG. 3 of the accompanying drawings, in use, the structure of FIGS. 1 and 2 is laid over and adhered to a thin layer 11 of magnetic material on or otherwise secured to a copper layer 13; the members 11 and 13 forming the actual heater element. The magnetic layer 11 may be, for instance, 2 skin depths thick, approximately 0.001 inch, assuming Alloy 42 with a permeability of 200, and a source frequency of 13.56 MHz. The copper layer 13 may be 0.01 inch thick to provide approximately 6 skin depths of shielding above the Curie temperature. The thickness of the entire device, taking into account the Nomex paper, is about 0.01 inch with a weight of less than a gram and will deliver to a large cable up to 150 watts of heat energy and as such is a virtually massless heater.

The assembly of FIG. 3 may include a solder layer 15 on the lower surface, as viewed in FIG. 3, so that the heater carries the solder required for the operation as an integral part of the heater.

Figure 4:
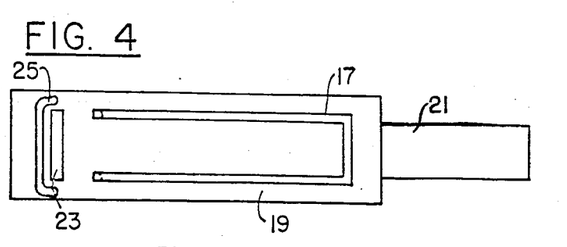
FIG. 4 is a top view of an energy circuit applied to a heater having a ground strap extending therefrom.

Referring now to FIG. 4 of the accompanying drawing, there is illustrated a modification of the structure of FIGS. 1-3 wherein a ground strap is provided as an integral part of the structure. An energizing circuit 17 is formed on a base 19, which in this case may be Kapton, to provide greater physical strength than that provided by the paper-like material of FIGS. 1-3. The copper substrate corresponding to the layer 13 of FIG. 3, has a tail (extension) 21 which is somewhat narrower than the layer 13 and serves as a ground strap as is described below.

The base 19 is provided with a transverse slot 23 to receive the ground strap 21 so that the structure may be looped about a cable and the ground strap used to tighten the structure about the workpiece. Held in this position, the device may be heated and secured to the workpiece with the strap 21 extending sufficiently to be connected to a grounding terminal.

The slot 23 is reinforced against tearing by a metal deposit 25 surrounding the slot on three sides; these being the sides that are stressed when the device is tightened by pulling on the ground strap.

Figure 5:
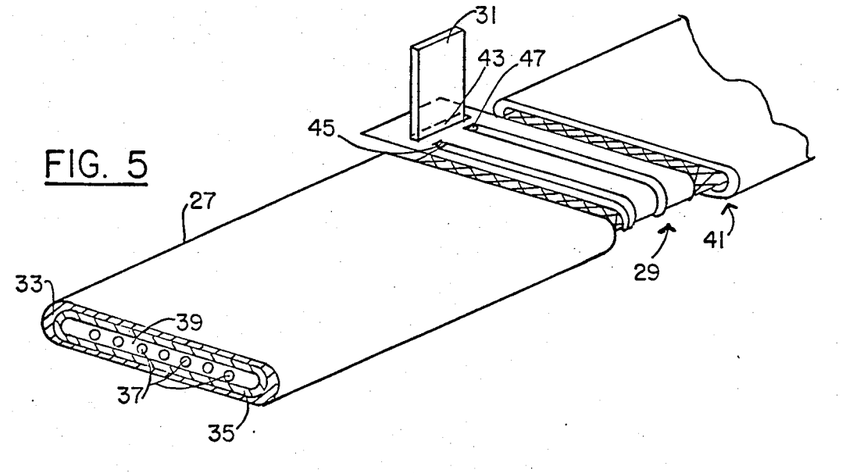
FIG. 5 illustrates the structure of FIG. 4 applied to a flat, shielded communications and/or computer cable.

Referring now to FIG. 5 of the accompanying drawings, there is illustrated a flat multi-conductor cable 27 with a structure 29 of the present invention incorporating a ground strap 31. The cable, which is intended to be illustrative of the type employed in local area networks connecting relatively widely separate components of a multi-data terminal installation including a central data processing unit, includes a tough, thick outer insulating layer 33. Lying immediately under the layer 33 is a double braid 35 utilized to provide a high degree of shielding of a plurality of conductors 37 embedded in an insulating layer 39.

As previously indicated, even though the cable has a double braid, electromagnetic interference can produce severe problems. Grounding of the braid at spaced intervals along the braid, 20' to 50', for instance, may be an excellent solution to the problem. This approach, although long desired, has not been used too often because of the difficulty of economically attaching a ground strap to the cable without cutting the cable in order to make a suitable connection. Such a procedure, known as "side entry," was very difficult at best, using prior art techniques, even though damage was not done to the cable.

Again, referring to FIG. 5, in the practice of the present invention, the insulation 33 is removed at 41, laying bare the braid 35. The structure 29 is looped about the braid and the ground strap 31 passed through slot 43 in the member 29 and a constant current applied across terminal 45 and 47.

The device 29 may be in the form of FIGS. 1-3 or FIG. 4 and may incorporate solder as a bottom layer or solder may be applied about the edges of the device 29 so that it flows under the strap at the solder's melt temperature.

Figure 6:
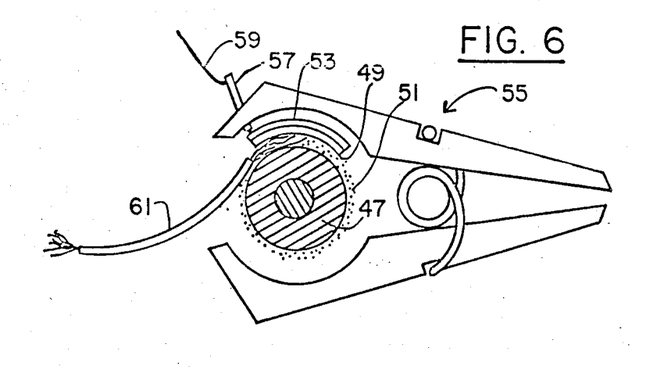
FIG. 6 illustrates a heater structure as illustrated in FIGS. 1-3 applied to a cable having a cross-section and held thereon by a clothespin-like tool.

If the device of FIG. 4 is employed, cinching may be accomplished by pulling on the strap 31. If the structure of FIGS. 1-3 is employed, a clamp may be employed as illustrated in FIG. 6 of the accompanying drawings. A circular cable 47 has a heater element 49 such as element 1113 (or 1115) of FIG. 3 disposed about it. The outer insulation of the cable has been removed to expose braid 51 which is contacted by the heater 49. An energizing circuit 53, such as elements 1, 3, and 5 of FIG. 1 is stuck to the heater, and a clothespin-like tool 55 is disposed about the entire structure. The tool 55 is equipped with contacts 57, only one of which is illustrated. Contacts 57 are adapted to be connected via leads 59 to a constant current source of high frequency, preferably, in this instance, 13.56 MHz. A ground wire 61 is inserted in the braid under the heater and thus when the system is energized, the wire is soldered to the braid.

It will be noted that the tool is sized so that the cable is gripped over center and the points of contact of the tool with the heater tend to tighten the heater about the cable so that intimate contact is maintained between the heater and the load, the braid.

In both of the cases illustrated in FIGS. 5 and 6, the heater applies heat very rapidly to the braid, the heat buildup in the heater being exceedingly rapid due to its unusually low mass, as little as 1 gram for a 150 watt heater and the ability to maintain the heater in intimate contact with the braid due to its high degree of flexibility. These factors and the fact that the area of heating is so well defined and concentrated result in soldering being completed well before any damage can be done to the insulation underlying the braid; this, even though the autoregulation temperature is wel above the destruction temperature of the insulation.

Figure 7:
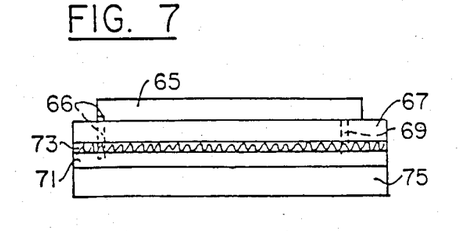
FIG. 7 is a side view in elevation of a further embodiment of. the present invention employing conductive rather than inductive coupling of the energizing circuit to the heater.
Figure 8:
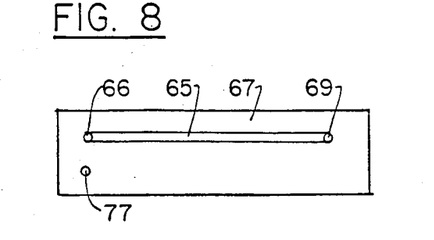
FIG. 8 is a top view of the structure of FIG. 7.

The devices thus far illustrated are inductive type devices wherein current in the heater is developed by magnetic fields resulting from current flow in the energizing circuit. In FIGS. 7 and 8 there is illustrated a conductive embodiment of the invention, that is, a device in which the current flows through a return conductor electrically in series with the heater.

Referring specifically to FIGS. 7 and 8, a copper bus 65 having a contact 66 adjacent its left end is formed on an insulating backing 67 which may be Kapton or Nomex or other suitable flexible high temperature insulation. A contact point 69 at the right end of bus 65 extends through insulation 67 and into contact with a layer 71 of magnetic material. The magnetic layer 71 may be permanently bonded to the insulating layer 69 or layer 69 may be provided with a sticky substance 73, as with Nomex paper, so that it may be temporarily adhered to the layer 71. A conductive layer 75 of copper, for instance, may be formed on the lower surface, as viewed in FIG. 7, of the layer 71. To complete the device, a contact 77 extends from the layer 65 adjacent contact point 66 through insulating layer 67 into contact with the magnetic layer 71.

The circuit thus defined commences with contact 66 and proceeds along bus 65, through contact 69, along the magnetic layer 71 and to contact 77 and in reverse with a.c. Below Curie temperature, the current flows along bus 65 and is confined in layer 71 to a narrow skin adjacent bus 65. Upon exceeding Curie temperature, the current spreads into layer 75 and autoregulation commences.

In the embodiments of FIGS. 1-5, a U-shaped energization circuit is employed even though it is apparent that the contact points could be located in the same positions with a straight conductor extending between them. The use of the U-shaped member doubles the length of a straight conductor and thus increases the resistance of the device. The preferred frequency of operation is about 13.56 MHz with the supply being matched over a 50 ohm, or lower characteristic impedance line by a matching circuit located between the line and the heater energization circuit. The higher the resistance of the heater, the less difficulty is encountered in the match, all as discussed more fully in copending application Ser. No. 586,715 filed Mar. 6, 1984 in the name of Philip S. Carter entitled High Efficiency Autoregulating Heater and assigned to the same assignee as the present invention. The U-shaped member more than doubles the length of a straight line conductor and this, coupled with the small cross section of the conductor, for instance, 0.003X.1=10, for instance.

Figures 9, 10, 11:
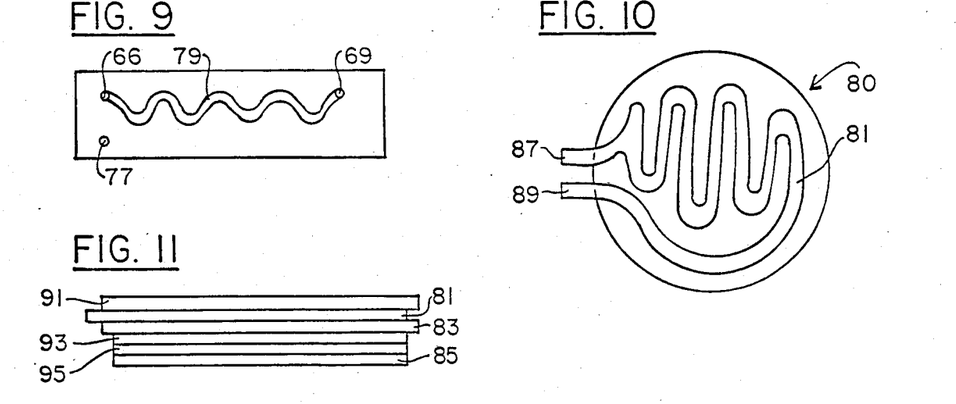
FIG. 9 is a top view of a modification of the structure of FIGS. 7 and 8 utilizing a serpentine conductor.
FIG. 10 is a top view of a heater structure employed as a patch.
FIG. 11 is a side view of the heater of FIG. 10.

The heater illustrated in FIG. 9 of the accompanying drawings is also a conductive connection type heater but employs a serpentine return bus 79 to considerably increase resistance of the device. Not only is the resistance of bus 79 increased, but the path in the magnetic material is constrained to follow the same path as current in conductor 79, thus greatly increasing resistance and further reducing matching problems.

Referring now specifically to FIGS. 10 and 11 of the accompanying drawings there is illustrated an embodiment of the present invention designed to serve as a patch on cracks in various surfaces. The thin, flexible nature of the device of the present invention is unusually adaptable to such a use since its flexibility allows it to adhere to relatively irregular contours of a body. The device generally designated by reference numeral 80 is circular or rectangular, (generally proportioned to approach a square), is quite thin and has a serpentine heater element 81 found on the upper surface of an insulating layer 83. The construction of the device may take the form of the heater elements of FIGS. 1, 3 or 7 and depending upon the material to be patched may have a bottom layer 85 of solder, thermosetting epoxy resin, plastic or the like. For instance, if the material to be patched is aluminum then a thermosetting material that will tightly bond to a aluminum is deposited on the bottom layer of the heater. The device 80 is then laid over the top of the crack, pressed against the aluminum surface and current applied via contacts 87 or 89. The heater of FIG. 7 may be used if the entire device is to be left in place. If, however, it is desired to build up several layers of metal, the device of FIG. 3 is preferred. Both the heater and insulation 83 together with insulation layer 91 over the heater are removed after soldering to the surface leaving an exposed magnetic material 93 or other metal surface and a layer 95 of copper or the like bonded to the base. A second device may now be applied over the first and so on until the build-up of metal is sufficient to provide the requisite strength.

If the base material to be repaired requires the use of a heat activated epoxy, plastic, etc., the same procedure is followed. Usually the epoxy if used as the base layer adhesive will be used throughout the build-up of metal and glue.

The serpentine heater is employed to permit large amounts of energy to be applied to the system as well as to distribute the heat relatively uniformly throughout the thermally responsive adhesive to heat the solder, epoxy, glue, etc.

The structure of FIGS. 10 and 11 as indicated is quite flexible but if metal build-up is required to insure a safe repair of cracks and the surface to be repaired is reasonably even, a thicker conductive layer, such as layer 95 in FIG. 11 may be employed whereby the number of patches required to achieve the requisite metal thickness may be reduced.

Figure 12:
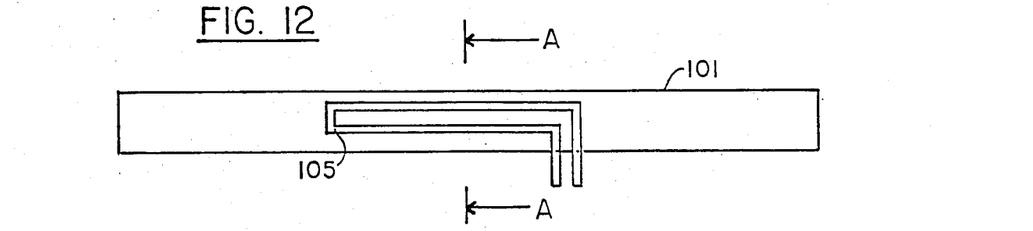
FIG. 12 is a top view of a modification of the heater of FIG. 14 illustrating another attachment means.
Figure 13:
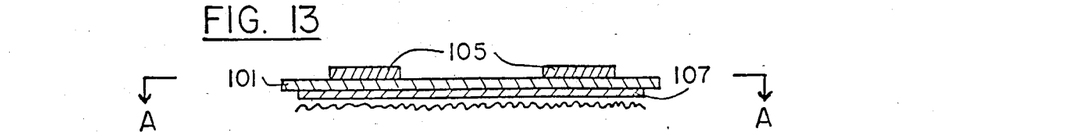
FIG. 13 is a sectional view in elevation of the heater of FIG. 12 taken along line A—A.
Figure 14:
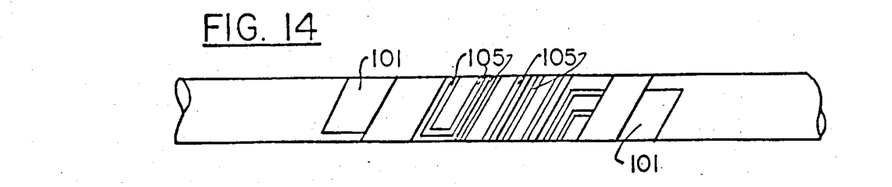
FIG. 14 illustrates the heater of FIGS. 12 and 13 applied to a pipe.

Referring now specifically to FIGS. 12 and 13 of the accompanying drawings, there is illustrated a further embodiment of the present invention which in overall structure is similar to a band-aid. The device comprises in general a long length 101 of insulating material having a heater 103 located generally centrally thereof and leaving top lengths of the insulating material extending from either side of the heater. The lengths of insulating material extending to either side of the heater have a contact adhesive deposited on the side opposite from the side energizing conductor 105 is disposed on, i.e. on the same side as magnetic material 107. A thermosetting adhesive such as epoxy glue or a solder may be disposed below, as viewed in FIG. 10, the magnetic material 107.

In use the device is merely stuck onto a surface to be heated or preferably is wrapped about it thereby to insure good contact between the heater and the object to be heated, the latter as viewed in FIG. 13 of the accompanying drawings.

The advantage of such a device is that unlike the device of FIGS. 10 and 11, the band-aid does not require external pressure during application, although neither device is a substitute for the other in all uses, particularly where the device of FIGS. 11 and 12 are employed as a structural element and a relatively large positive pressure on top of the device is required to ensure an intimate bond throughout the entire region covered by the patch.

The patch may employ the thicknesses set forth relative to the device of FIGS. 1–4 and should be used where a somewhat uneven contour is encountered. Where, however, the contours are even and a large build-up of material is required, the bottom of conductive layer of the heater may be thickened up without departing from the spirit of the invention.

As previously indicated, the devices of the present invention are quite thin providing an usually low mass and high power to mass ratio. The small size of the buses and related circuits result from the ability to closely space narrow elements. Tests such as those conducted on a heater with an 8" long bus, produced the results illustrated in FIGS. 15 & 16 and form the basis of such statements.

Figure 15:
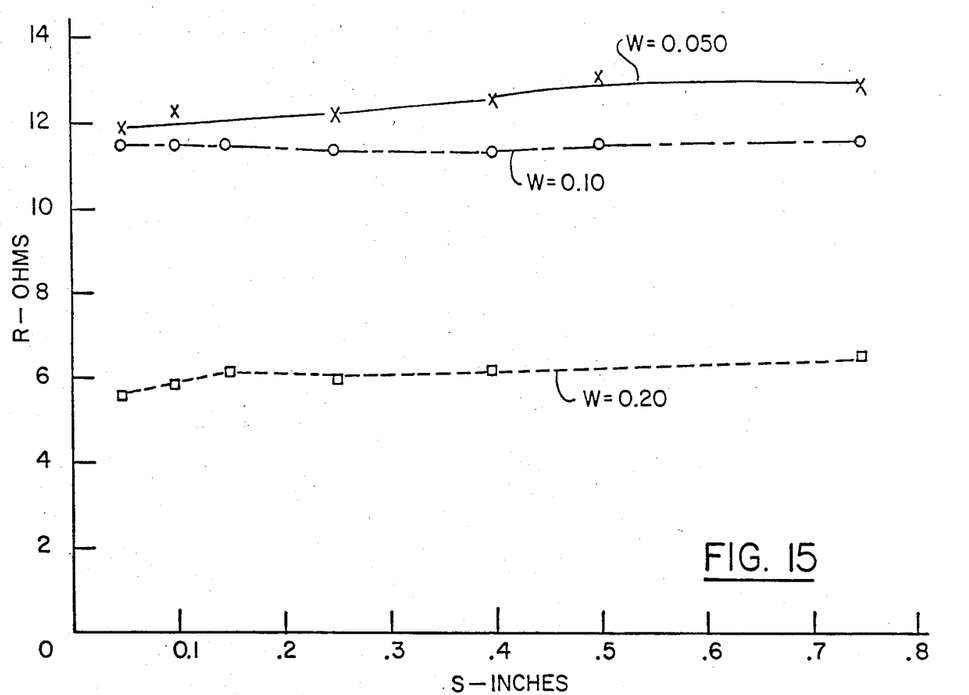
FIG. 15 is a graph plotting resistance of a U-shaped energizing circuit as a function of conductor width and separation of the legs of the U.

Referring specifically to the graph of FIG. 15, the graph depicts resistance as a function of bus separation, i.e., the separation between legs of the U-shaped construction of FIGS. 1–3 for various widths of the conductor. It is seen that above approximately 0.1 inch separation or more, the bus resistance remains essentially constant regardless of conductor width "w". It will be noted that with a conductor width of 0.05", resistance drops materially below separations of 0.2 or less. Thus, if conductor widths of 0.1 or greater and conductor separation of approximately 0.1 or more or conductor spacings of 0.25 inch or more are maintained, relatively high resistances are achieved. Spacing and widths of 0.1 are preferred in most instances providing quite high resistance, i.e., 6 to 6.5 ohms. The arrangement of FIG. 9 provides even greater resistances than those illustrated.

Figure 16:
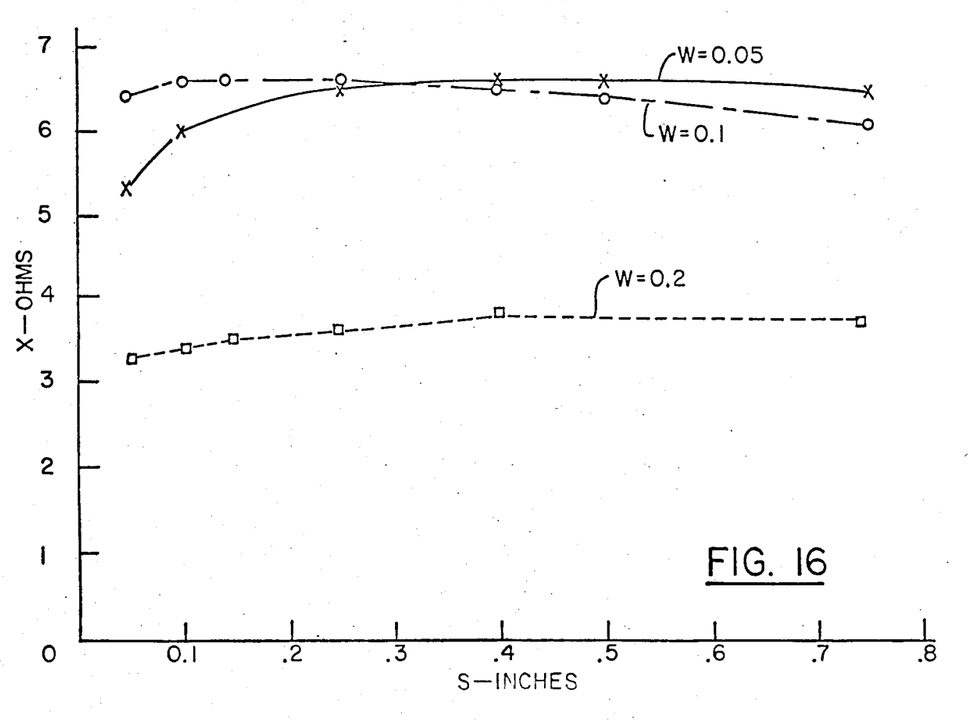
FIG. 16 is a graph plotting inductance of a U-shaped energizing circuit as a function of conductor width and separation of the legs of the U.

The effects of conductor width and separation on the reactive components of impedance are illustrated by the graphs of FIG. 16. Much the same characteristics are present as in the resistive case. A conductor width of 0.05" produces a downward sloping curve, a width of 0.1" produces an essentially flat curve down to separations of about 0.15 inch. The above dimensions of width and depth are for a 13.56 MHz system having energizing circuit thicknesses of approximately 0.003 inch. The circuits on which these tests were conducted are adapted to deliver 150 watts of power under full load.

The term 'constant current" as employed herein does not mean a current that cannot increase, but means a current that obeys the following formula:

$$\frac{\Delta |I|}{|I|} > -\frac{1}{2}\frac{\Delta R}{R}$$

where I is the load current.

Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is controlled in accordance with the above formula, autoregulation is achieved. Thus, when large autoregulating ratios are not required, constraints on the degree of current control may be relaxed thus reducing the cost of the power supply.

The above equation is derived by analyzing the equation:

$$P = |I|^2 R$$

where P is power and I is the current in the load.

Differentiating P with respect to R $$\frac{dP}{dR} = |I|^2 + 2RI \frac{d|I|}{dR}$$

to satisfy the requirements for autoregulation dP/dR>0.

Thus, $$|I^2| + 2R|I| \frac{d|I|}{dR} > 0,$$

which reduces to the above equation. It should be noted, however, that the more constant the current, the better the autoregulation ratio.

Figures 17, 18:
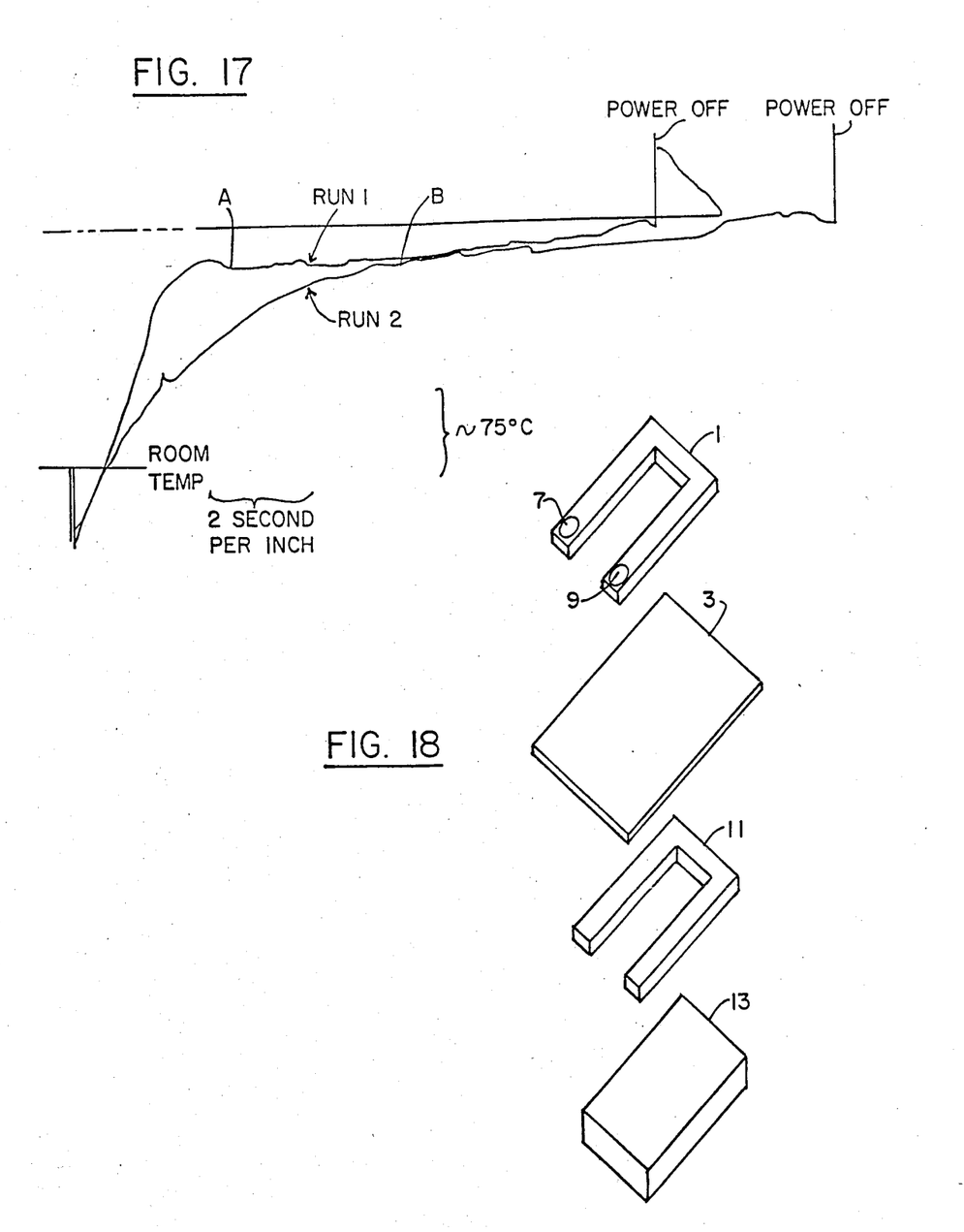
FIG. 17 is a plot of the time required for a strap according to FIGS. 1-3 to reach Curie temperature when coupled to a 6" length of Ethernet ® interconnect cable.

Various types of autoregulating heaters may be employed in the present invention and reference is made to the following U.S. serial numbers, all assigned to the assignee of this application:

Referring now specifically to FIG. 17 of the accompanying drawings, there is illustrated a graph of temperature versus timefunction for a specific strap, according to the invention. The strap of the type of FIG. 1 used Invar 36 as the magnetic material on copper with a forward wattage of 100 supplied at 13.56 MHz. The strap had a bottom layer of solder and was wrapped around a six inch length of a ⅜" D Ethernet ® cable having a double braid; such cable being commonly used for interconnecting local area computer networks.

The experiment designated Run 1 was with the heater device applied to the cable as in FIG. 6 of the accompanying drawings. Such an installation provides relatively poor contact between the heater and load and in consequence, the heater comes quicly up to temperature in about four seconds as measured by a thermocouple located between the strap and the cable.

The solder melts at location A as indicated by the dip in the curve, but due to thermal lag in the cable, good wetting of the braid does not occur until after about 8 to 10 seconds at which time the operation is complete.

The second run, Run 2, was made with the identical set-up except that due to the initial run, the strap is soldered to the cable resulting in excellent thermal contact between the heater and the braid. In this instance, the elapsed time to completion of the process which in this case is fusion of the solder is about the same as in Run 1, 8–10 seconds, (Point B on Run 2) but the heat build-up is more gradual due to the fact that the entire load is assumed from the beginning of the cycle. Also, the thermocouple in this case more closely follows the temperature of the braid than it did in Run 1.

Another factor that affects the performance of the device is the width to thickness ratio of the magnetic layer. If the magnetic layer is completey surrounded by a conductive layer then the intrinsic permeability of the magnetic material may be realized. If, however, the magnetic layer has exposed edges as in the present application then the intrinsic permeability cannot be realized. The equation for the relationship between intrinsic and effective permeability for a rectangle is extremely complex but can be approximated by the following equation for an ovoid.

$$\mu_E = \mu_I \frac{1}{1 + \mu_I \left(\frac{t}{w + t}\right)}$$

where $\mu_E$ is effective permeability, $\mu_I$ is intrinsic permeability, t is thickness and w is width. The table below illustrates the effect of both permeability and the w/t ratio on the effective permeability.

| | $\mu I$ | |
|---|---|---|
| w/t | 200 | 400 |
| 10 | 10 | 10 |
| 25 | 23 | 24 |
| 50 | 41 | 44 |
| 100 | 67 | 80 |
| 200 | 100 | 133 |
| 300 | 120 | 171 |
| 400 | 133 | 200 |
| 500 | 143 | 227 |
| 1000 | 167 | 286 |

Thus it is seen that the greater the ratio the higher the effective permeability and the lower the intrinsic permeability the higher the ratio of $\mu_E/\mu_I$. For instance, the ratio of $\mu_E/\mu_I$ for w/t equal to 1000 is 0.835 for a permeability of 200 but is only 0.175 for a permeability of 400.

Once given the above disclosure, many other features, modifications and improvements will become apparent to the skilled artisan. Such other modifications, features and improvements are, therefore, considered a part of this invention, the scope of which is to be determined by the following claims:

I claim:

1. A temperature autoregulating heater system that is highly flexible so that it may be tightly wrapped about bodies of irregular shape or quite small radii and having a power to mass ratio such as to be virtually massless, whereby as a result of intimate contact between said heater and the body to be heated and the low mass of the heater, such body may be rapidly heated, said heater comprising
    a thin, flexible layer of electrical insulating material having opposed elongated surfaces,
    a thin, narrow, conductor formed on one of said elongated surfaces,
    a thin, layer of magnetic material,
    said insulating material having a layer of adhesive on another of said elongated surfaces whereby said insulating material may be contacted with and retained on said layer of magnetic material, and
    means permitting application of power of said to said conductor to cause the temperature of said magnetic material to approach its Curie temperature.

2. The system according to claim 1 further comprising a layer of high electrical and thermal conductivity formed on a surface of said magnetic material remote from the surface to be contacted by said adhesive.

3. The system according to claim 1 or claim 2 wherein said heater has a power to mass ratio of approximatey 150 watts per gram.

4. The system according to claim 1 or claim 2 wherein said conductor is U-shaped and has a thickness of 0.0002 to 0.0003 inch, a conductor width of approximately 0.1 inch or more and a spacing between legs of the U-shaped conductor of approximately 0.1 inch or more.

5. The system according to claim 4 wherein said conductor is a printed circuit on said insulating layer.

6. The system according to claim 2 wherein said layer of high electrical and thermal conductivity has an integral extension therefrom defining a conductive strap.

7. The system according to claim 6 wherein said insulating layer has a slot therein for receiving said conductive strap at an end of said layer remote from the origin of said extension.

8. The system according to claim 7 wherein said slot has a reinforcing material deposited on said insulating layer about regions of said slot.

9. The system according to claim 1 or claim 2 or claim 6 wherein said conductor and said magnetic layer are connected electrically in series.

10. The system according to claim 1 wherein said conductor is serpentine.

11. The system according to claim 1 or claim 2 or claim 6 wherein said conductor and said magnetic layer are coupled magnetically.

12. The system according to claim 11 wherein said conductor comprises at least one U-shaped conductive path.

13. The system according to claims 1, or 2, or 6 wherein said conductor extends beyond said magnetic layer to provide a tab extending beyond the heater structure.

14. A temperature autoregulating heater system according to claim 1 wherein said conductor is a foil.

15. A temperature autoregulating heater arrangement that is flexible so that it may readily conform to the surfsace of a body to which it is to transfer heat and having a quite high power to mass ratio, whereby as a result of intimate contact between said heater and the body to be heated and the low mass of the heater, such body may be rapidly heated, said heater comprising
a thin, flexible layer of electrical insulating material having opposed surfaces,
a thin flexible layer of electrical insulating material having opposed surfaces,
a thin, narrow, conductor formed on one of said surfaces,
a thin layer of magnetic material,
said insulating material having a layer adhesive on the other of said surfaces whereby said insulating material may be contacted with and removably retained on said layer of magnetic material, and
means permitting application of power to said conductor.

16. The arrangement according to claim 15 further comprising a layer of high electrical and thermal conductivity formed on a surface of said magnetic material remote from the surface to be contacted by said adhesive.

17. The arrangement according to claims 15 or 16 wherein said conductor is serpentine and is disposed relativey uniformly over said one surface.

18. The arrangement according to claims 15 or 16 wherein said insulating material extends appreciably beyond the edge of said magnetic layer in at least one direction,
an adhesive being applied to said other surface of the extension of said insulating layer.

* * * * *

UNITED STATES PATENT AND TRADEMARK OFFICE
CERTIFICATE OF CORRECTION

PATENT NO. : 4,659,912

DATED : April 21, 1987

INVENTOR(S) : Rodney L. Derbyshire

It is certified that error appears in the above-identified patent and that said Letters Patent is hereby corrected as shown below:

Column 3, lines 22 and 23, should read:

A thermosetting bonding agent which may be solder, epoxy glue or the like contacts the surface to be repaired.

Signed and Sealed this

Seventh Day of July, 1992

Attest:

DOUGLAS B. COMER

*Attesting Officer*     *Acting Commissioner of Patents and Trademarks*